(12) United States Patent
Glimpel et al.

(10) Patent No.: US 10,646,968 B2
(45) Date of Patent: May 12, 2020

(54) FINISHING TOOL, IN PARTICULAR END MILLING CUTTER

(71) Applicant: Franken GmbH & Co. KG Fabrik fuer Praezisionswerkzeuge, Rueckersdorf (DE)

(72) Inventors: Helmut Glimpel, Lauf an der Pegnitz (DE); Hans-Juergen Lauffer, Lauf an der Pegnitz (DE); Andreas Bremstahler, Happurg (DE)

(73) Assignee: FRANKEN GMBH & CO. KG FABRIK FUER PRAEZISIONSWERKZEUGE, Rueckersdorf (DE)

( * ) Notice: Subject to any disclaimer, the term of this patent is extended or adjusted under 35 U.S.C. 154(b) by 0 days.

(21) Appl. No.: 15/764,739

(22) PCT Filed: Sep. 16, 2016

(86) PCT No.: PCT/EP2016/071994
§ 371 (c)(1),
(2) Date: Mar. 29, 2018

(87) PCT Pub. No.: WO2017/055108
PCT Pub. Date: Apr. 6, 2017

(65) Prior Publication Data
US 2018/0281126 A1    Oct. 4, 2018

(30) Foreign Application Priority Data
Sep. 29, 2015    (DE) .......................... 10 2015 116 443

(51) Int. Cl.
*B23C 5/10* (2006.01)
*B23P 9/02* (2006.01)

(52) U.S. Cl.
CPC .................. *B23P 9/02* (2013.01); *B23C 5/10* (2013.01); *B23C 2210/54* (2013.01); *B23C 2220/28* (2013.01); *B23C 2270/06* (2013.01)

(58) Field of Classification Search
CPC .... B23C 5/10; B23C 5/12; B23C 5/14; B23C 2210/54; B23C 2220/28
See application file for complete search history.

(56) References Cited

U.S. PATENT DOCUMENTS

| 4,610,581 A | * | 9/1986 | Heinlein | .................... B23C 5/10 144/240 |
| 5,112,171 A | * | 5/1992 | Daetwyler | ................ B23C 3/02 407/44 |

(Continued)

FOREIGN PATENT DOCUMENTS

| CH | 638126 A5 | 9/1983 |
| CN | 1784283 A | 6/2006 |

(Continued)

OTHER PUBLICATIONS

International Preliminary Report on Patentability for PCT/EP2016/071994, dated Apr. 3, 2018.

(Continued)

*Primary Examiner* — Sara Addisu
(74) *Attorney, Agent, or Firm* — Workman Nydegger

(57) ABSTRACT

A finishing tool of an end milling cutter can comprise: a chip-removing milling edge, which extends continuously with respect to the tool axis (A) over an axial length (L) on a circumferential surface (U), which is rotationally symmetrical about the tool axis, and removes workpiece chips from the workpiece surface at a radial chip-removing engagement depth (T to Tmax), and at least one non-cutting pressing ridge, which extends continuously axially with respect to the tool axis (A) over an axial length (L) on a circumferential surface which is rotationally symmetrical (Continued)

Figure 1:
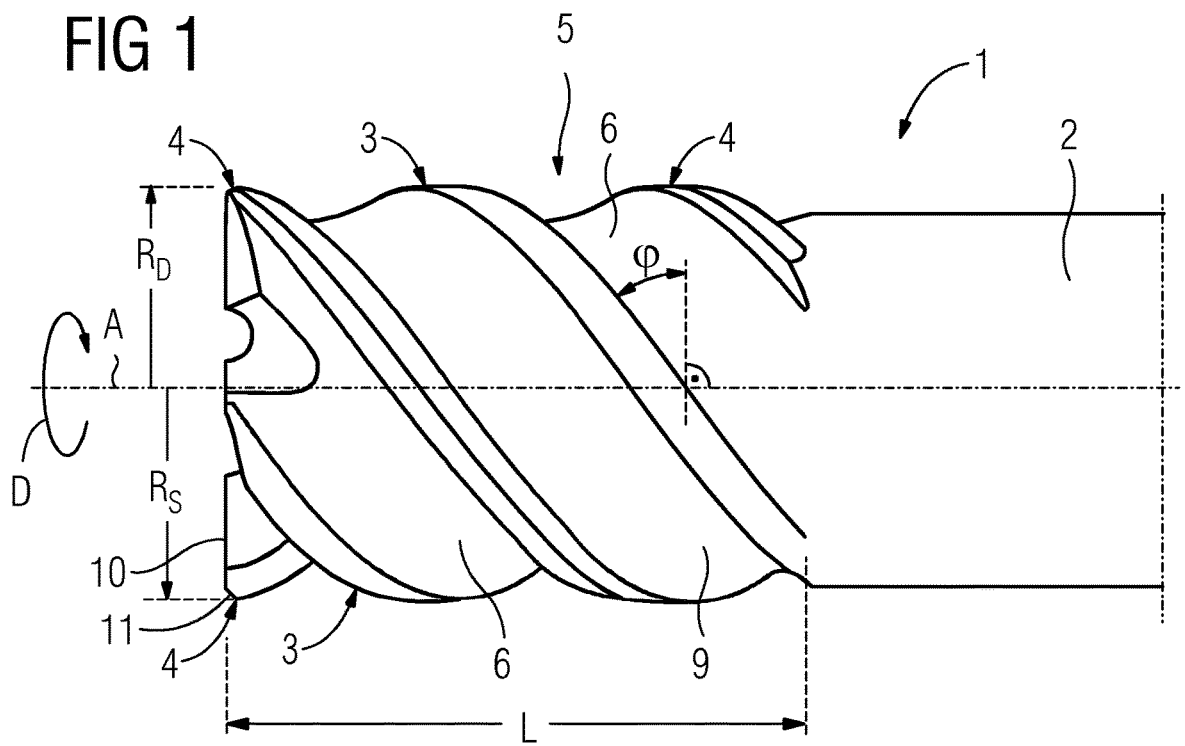

about the tool axis, is arranged following an associated milling edge by a pitch angle, and presses over its entire axial length (L), during the milling movement, at a radial non-cutting engagement depth (T or $R_S-R_D$) with respect to the tool axis into the workpiece surface machined by the associated milling edge, and smooths said workpiece surface.

9 Claims, 4 Drawing Sheets

(56) References Cited

U.S. PATENT DOCUMENTS

| | | | | |
|---|---|---|---|---|
| 10,195,676 B2* | 2/2019 | Ootaka | ...................... | B23C 5/20 |
| 2004/0120777 A1* | 6/2004 | Noland | ...................... | B23C 5/10 |
| | | | | 407/63 |
| 2008/0260475 A1* | 10/2008 | Bodewig | ................ | B23C 5/207 |
| | | | | 407/42 |
| 2008/0273931 A1* | 11/2008 | Spitzenberger | ......... | B23C 5/202 |
| | | | | 407/51 |
| 2014/0356083 A1* | 12/2014 | Budda | ...................... | B23C 5/10 |
| | | | | 407/54 |
| 2015/0050095 A1* | 2/2015 | Krenzer | ................... | B23C 3/02 |
| | | | | 409/132 |
| 2015/0209877 A1* | 7/2015 | Hufschmied | ............. | B23C 5/10 |
| | | | | 409/131 |
| 2016/0001382 A1* | 1/2016 | Takahashi | ................ | B23C 5/10 |
| | | | | 407/54 |
| 2017/0266739 A1* | 9/2017 | Yamasaki | ................ | B23C 5/10 |

FOREIGN PATENT DOCUMENTS

| | | |
|---|---|---|
| CN | 2820395 Y | 9/2006 |
| DE | 1137284 B | 9/1962 |
| DE | 202006013594 U1 | 3/2007 |
| DE | 202007015742 U1 | 2/2008 |
| DE | 102006053330 | 5/2008 |
| DE | 102008002406 | 12/2009 |
| EP | 1669149 B1 | 6/2006 |
| EP | 2058074 A1 | 5/2009 |
| WO | 2008055489 A2 | 5/2008 |

OTHER PUBLICATIONS

Office action dated Mar. 1, 2019 from Chinese Patent Application No. 201680056877 filed Mar. 29, 2018.

Notification to Grant Patent Right for Invention dated Sep. 10, 2019 from Chinese Patent Application No. 201680056877 filed Mar. 29, 2018.

* cited by examiner

FINISHING TOOL, IN PARTICULAR END MILLING CUTTER

CROSS-REFERENCE TO RELATED APPLICATIONS

The present invention is a 35 U.S.C. § 371 U.S. National Stage Application corresponding to PCT Application no. PCT/EP2016/071994, filed on Sep. 16, 2016, which claims the benefit of priority to German Patent Application No. 102015116443.4 filed Sep. 29, 2015, the entire content of each of the aforementioned patent applications is incorporated herein by reference.

BACKGROUND OF THE INVENTION

1. Field of the Invention

The invention relates to a tool, in particular to an end milling cutter.

An end milling cutter is provided for removing material over the area of a workpiece surface and, for this purpose, is moved in a milling movement by rotation of the end milling cutter about a tool axis in a predetermined direction of rotation while simultaneous advancing along the workpiece surface relative thereto, generally parallel to the workpiece surface. As a rule, an end milling cutter has a substantially cylindrical shaft which is elongate along the tool axis, and an adjoining head part with a circumferential region having circumferential milling edges and an end side with or without end milling edges. At the end facing away from the head part, the end milling cutter has a clamping region for clamping in a tool holder which is coupled to a machine tool.

In order to enable chip-removing removal of material over an area, the circumferential milling edges extend continuously and without interruptions axially with respect to the tool axis (or: in a projection onto the tool axis) over an axial length on a generally cylindrical circumferential surface which is rotationally symmetrical about the tool axis and engages substantially over their entire axial length in the workpiece surface at an engagement depth which is radial with respect to the tool axis. The axial length of the milling edges is significantly greater here, as a rule greater by at least the factor of 5 to 10, than the radial engagement depth. Although the circumferential milling edges may also extend rectilinearly parallel to the tool axis, they are as a rule designed running in a twisted or helical manner at a helix angle about the tool axis. By means of the milling movement, the discontinuous cutting, which is characteristic of milling, of the milling edges takes place, said cutting bringing about removal of chips of the workpiece over the surface.

A distinction is made in respect of the surface quality of the machined surface between roughing cutters, in which a coarser surface is produced with roughing edges with greater chip removal (or: chip volume) because of a higher feed rate, on the one hand, and finishing cutters, in which a finer or smoother surface is produced with smooth finishing edges with less chip removal because of a lower feed rate, on the other hand.

For rough milling, in addition to a smooth design not having any turning points (points at which the curvature changes in sign), the circumferential milling edges can sometimes also be designed in the radial direction in a slightly wavy manner with elevations and depressions (or: crests and valleys) and turning points in between. The elevations provided in the case of roughing cutters with undulating cutting edges then form round chip dividers, owing to which the chips are split up, as a result of which a greater chip volume or a deeper engagement into the workpiece with greater chips is possible.

For finishing milling, the circumferential milling edges of an end milling cutter are, by contrast, normally designed to be smooth in the radial direction and without turning points in order to permit the high surface quality or correspondingly smooth surface on the workpiece during finishing. Finishing milling edges are therefore designed to be smooth and without chip dividers.

Finally, there are also semifinishing cutters which have flat chip dividers which lie on an imaginary straight line and are separated from one another by generally round depressions.

In all three types of cutters: finishing cutters, roughing cutters and semifinishing cutters, each milling edge cuts over its entire length. The radial engagement depth is therefore deeper than the depressions in the milling edges of the roughing cutters and of the semifinishing cutters or, in other words, greater than the height of the elevations, and therefore the material is removed over the entire area of the workpiece surface, along which the milling edges move, wherein the elevations merely act as chip dividers for the removed chips.

2. Background

EP 2 058 074 A1 discloses a milling cutter for chip-removing machining of workpieces, with a cylindrical tool shaft having a milling region which has at least one milling edge. The milling edge is placed in the circumferential direction of the milling cutter and extends in a screw thread having a pitch angle which is angled in relation to the center axis of the milling cutter, wherein the milling edge is in each case adjoined by a chip removal flute for removing the chips, which are produced during the milling, of the workpiece being machined, with a free surface starting from the milling edge. At least part of the free surface is provided with a roughing toothing which starts from the milling edge and, as seen in the circumferential direction of the milling cutter, extends over at least part of the cross section of the respective chip removal flute. The roughing toothing is designed in the longitudinal direction of the screw threads as a roughened surface of the free surface and has in particular a serrated edge which has crests and valleys in an alternating manner.

DE 20 2006 013 594 U1 discloses a combined roughing/finishing milling cutter, in which the milling surfaces in the circumferential direction of the milling cutter lie on the screw threads and in each case one screw thread is provided with a roughing surface and a further screw thread is provided with a smooth finishing surface, or else the milling surface of a screw thread is provided with roughing regions and finishing regions in an alternating manner.

U.S. Pat. No. DE 1,137,284 discloses a milling cutter having teeth which are turned back or ground back, are arranged in the form of threads and each sit next to one another on individual studs, wherein round roughing teeth and flattened finishing teeth are arranged in an alternating manner in the form of threads on each tooth stud, wherein the successive distances from one roughing tooth to the finishing tooth arranged next thereto differ in size. As a result, very much larger chips are removed by the rounded roughing teeth than by the flat finishing teeth.

CH 638 126 A5 discloses a tool for the fine machining of bores by non-cutting deformation by means of a tumbling movement, with a head which carries at least one shaping element and is arranged on a pin of a holder, wherein the head on the pin is rotatable about an axis which is inclined with respect to the axis of the holder, and wherein the working surface of each shaping element lies on an imaginary spherical casing of the head.

EP 1 669 149 B1 discloses a threading tool and a method for producing a thread. In a thread-producing region, the threading tool comprises at least one chip-removing thread-milling tooth and at least one thread-shaping tooth or thread-shaping wedge operating in a non-cutting forming manner. During the production of the thread, the thread-milling tooth and thread-shaping tooth rotate together about a tool axis and are arranged offset with respect to each other or consecutively or following one another along an outer circumference of the thread-producing region in the direction of rotation about the tool axis and, as a result, engage in the workpiece surface in an alternating manner during the rotation. The thread-milling tooth and thread-shaping tooth produce different profile portions of the thread profile (thread cross section), i.e. their active profiles supplement each other to form the finished thread profile. In each case a number of thread-milling teeth and thread-forming teeth which are spaced apart axially with respect to one another about the thread pitch are arranged in each case one row which is axial with respect to the tool axis, wherein the rows can be formed in a manner twisted about the tool axis or else running rectilinearly and parallel to the tool axis. As seen axially, gaps are formed between the thread-milling teeth and also between the thread-shaping teeth, in which gaps in the workpiece surface are not machined, and therefore only the desired thread with the desired thread pitch is produced and the material of the workpiece remains in between. The axial length of each thread-milling edge of each thread-cutting tooth or of the thread-shaping ridge of each thread-shaping tooth is somewhat smaller than the width of the thread because of the inclination by the thread pitch and is only approximately the same size as the radial engagement depth which is determined by the tooth height. The milling edge of the thread-milling tooth and the shaping ridge of the thread-shaping tooth furthermore do not lie on an in particular cylindrical circumferential surface which is rotationally symmetrical about the tool axis because of their inclination in accordance with the thread pitch and their active thread profiles. This threading tool moves in a special circular movement which is composed of a helical movement about the thread axis, said helical movement being matched to the thread pitch and the thread diameter, and of a more rapid rotation about the tool axis, and has a radial engagement depth which has to be precisely kept to, as is customary during thread milling.

The tool according to EP 1 669 149 B1 is therefore a highly specific threading tool which is not suitable for removing material over an area of a surface of a workpiece, such as in the case of an end milling cutter, but rather only for producing a thread in the specific thread-milling movement.

BRIEF SUMMARY OF THE INVENTION

In certain application purposes, it is desirable for a component firstly to be manufactured from a solid material and secondly to have to meet exacting optical and haptic demands, for example in the case of valuable aluminum housings of mobile telephones. A particularly valuable surface having very high surface quality therefore has to be produced here. If such a part having such a good surface is intended to be milled from a material, it has hitherto been required to refinish the component in one or more subsequent working steps with finishing tools operating with greater precision in order to produce a smoother surface having improved dimensional and shape accuracy or surface quality. Finishing of this type may also be provided as preparation for polishing. However, a plurality of different tools and working steps are required for this purpose.

It is therefore an object of the invention to provide a novel finishing tool, in particular a finishing tool which machines a surface of a workpiece with high surface quality in one working step.

DETAILED DESCRIPTION OF THE PREFERRED EMBODIMENTS

Embodiments and subject matter according to the invention suitable for achieving this object are specified in particular in the patent claims.

The claimed combinations of features and subject matter according to the invention are not restricted to the version selected and the selected dependency references of the patent claims. On the contrary, every feature in the patent claims can also be claimed, even independently of their dependency references, in any desired combination with one or more other features in the patent claims. In addition, any feature which is described or disclosed in the description or drawing can be claimed for itself, independently or detached from the context in which it stands, alone or in any combination with one or more other features described or disclosed in the patent claims or in the description or drawing.

The finishing tool, in particular end milling cutter, according to patent claim 1 is suitable and determined for removing material over an area of a workpiece surface and for smoothing the workpiece surface in a milling movement by rotation about a tool axis in a predetermined direction of rotation with simultaneous advancing relative to the workpiece surface, and comprises at least one chip-removing milling edge and at least one non-cutting pressing ridge. Each milling edge extends continuously and without interruptions axially with respect to the tool axis over an axial length on a circumferential surface which is rotationally symmetrical about the tool axis, and is designed in such a manner that, over its entire axial length, during the milling movement, it removes workpiece chips from the workpiece surface at a radial chip-removing engagement depth with respect to the tool axis.

Each pressing ridge extends continuously and without interruptions axially with respect to the tool axis over an axial length on a circumferential surface which is rotationally symmetrical about the tool axis, and is designed in such a manner that, over its entire axial length, during the milling movement, it presses at a radial non-cutting engagement depth with respect to the tool axis into the workpiece surface machined by the associated milling edge, and smooths and/or compresses said workpiece surface. At least one pressing ridge is arranged following an associated milling edge by a pitch angle, as seen in the direction of rotation.

In embodiments, in particular as claimed in claim 1, the axial length is greater by at least a factor of 5, in particular a factor of 8, than the chip-removing engagement depth and is greater by at least a factor of 10, in particular a factor of 16, than the non-cutting engagement depth. Such embodiments do not include thread milling cutters, the thread cutting edges of which are significantly shorter and which are also not finishing tools having the features according to the present invention.

In embodiments, in particular as claimed in claim 2, the circumferential surface of each milling edge and of each pressing ridge is at a radial distance, which is constant over the axial length, with respect to the tool axis, i.e. is in particular cylindrical. This embodiment is in particular smoothed by an end milling cutter or is comparable thereto.

In embodiments, in particular as claimed in claim 2, the circumferential surface of each milling edge and of each pressing ridge is at a radial distance, which increases monotonously, with respect to the tool axis over the axial length in an axial direction which is preferably directed away from an end side. This includes in particular spherical segments which are at maximum the same size as hemispheres, such as occur, for example, in the case of ball milling cutters, or conical shapes, such as in the case of angle milling cutters, or concavely or convexly curved shapes, such as, for example, in the case of profile milling cutters. They do not include thread milling cutters, the cutting edge shape of which firstly increases monotonously and then decreases monotonously again.

A "continuous" milling edge and a "continuous" pressing ridge "without interruptions" means that the milling edge and the pressing ridge in each case engage continuously over their entire length in the workpiece material during the machining.

Advantageous refinements and developments of the tool according to patent claim 1 or patent claim 2 emerge from the patent claims which are respectively dependent on patent claim 1 or 2.

The finishing tool according to the invention is a combination tool which operates both in a chip-removing and in a non-cutting manner (or: in a deforming, plastically deforming or smoothing manner) in a milling movement, i.e. in a rotational movement about the dedicated tool axis with a simultaneous advancing movement along the surface, preferably perpendicular to the tool axis.

The invention is based here on the consideration of arranging a chip-removing region and a non-cutting region one behind the other in the direction of rotation, and therefore the chip-removing regions and the non-cutting regions engage successively in the workpiece during rotation of the finishing tool about the tool axis. In this sequence, during the machining of the workpiece, first of all cutting and then smoothing and/or compressing take place in an alternating manner. An intermittent or discontinuous manner of operation of the finishing tool according to the invention is therefore involved, in which the workpiece surface to be machined is simultaneously milled and also shortly after smoothed and/or compressed in a non-cutting manner. An advantage of such a finishing tool is that, after the machining, the workpiece has high surface quality. The surface which is produced appears finely ground to be polished by means of this procedure.

In a method for removing material over an area of a workpiece surface and for smoothing and/or compressing the workpiece surface, work is carried out, in further aspects of the invention, by means of a finishing tool according to the invention which is rotated in a predetermined direction of rotation about its tool axis in a milling movement and at the same time is moved in an advancing movement relative to the workpiece surface, wherein, during the removal of the material, the advancing movement takes place exclusively in directions or planes perpendicular to the tool axis, and/or does not contain any axial movement component with respect to the tool axis. This corresponds to milling along the surface and fundamentally differs in the manner of operation from thread milling.

In a preferred embodiment, each pressing ridge is separated (in the circumferential direction) from a milling ridge with the associated milling edge leading in the direction of rotation by a first separating groove which is provided in particular as a cooling and/or lubricating groove for supplying coolant and/or lubricant to the pressing ridge and/or to the pressing surface.

In a further preferred embodiment, each milling ridge is separated from a pressing ridge following in the direction of rotation by a second separating groove which is provided in particular as a chip groove for removing chips from the milling edge.

The first separating groove, in particular cooling and/or lubricating groove, preferably has a radial groove depth which is smaller, preferably smaller by 10% to 35%, than the radial groove depth of the second separating groove, in particular chip groove.

In a particularly advantageous embodiment, the pressing ridge has a pressing surface which increases in its radial distance from the tool axis in the opposite direction to the direction of rotation, in particular as far as a pressing spine in a rear region of the pressing surface, as seen in the direction of rotation. The increase is in particular substantially linear. The difference of maximum radial distance and minimum radial distance preferably defines a maximum non-cutting engagement depth.

In one embodiment, the pressing surface or the pressing spine is adjoined, as seen in the opposite direction to the direction of rotation, by a free surface and by a back surface of the pressing ridge, which back surface is adjacent to said free surface or is directly adjacent to a separating groove, in particular chip groove.

In one embodiment, a radially inwardly running front surface of the pressing ridge is arranged upstream of the pressing surface, as seen in the direction of rotation, said front surface being adjacent to a cooling and/or lubricating groove.

A shaping angle of the pressing surface of between −5° and −50° and/or a free angle of the free surface of the pressing ridge of between 5° and 60° and/or an angle of inclination of the front surface of the pressing ridge of between −15° and −85° can now be selected.

Each milling edge is preferably formed on a milling ridge.

In one embodiment, as seen in the opposite direction to the direction of rotation, the milling edge is adjoined by a free surface and/or by a back surface, in particular of the milling ridge, which back surface is adjacent to a separating groove, in particular cooling and/or lubricating groove.

In one embodiment, a rake surface which is adjacent to a chip groove is arranged upstream of the milling edge, as seen in the direction of rotation. A rake angle of the rake surface can be selected from a range of 0° to 20°, for example 5° to 10°, and/or a free angle of the free surface of the milling ridge can be selected to be between 4° and 45°.

In a particularly advantageous embodiment, the pitch angle between a milling edge and a directly following pressing surface, as seen in the direction of rotation, in particular the pressing spine thereof, is smaller, for example smaller by 5% to 30%, than the pitch angle between said pressing surface, in particular the pressing spine thereof, and the milling edge directly following the latter, as seen in the direction of rotation.

In a particularly advantageous and preferred embodiment, in each case the same axial position along the tool axis, and preferably over the entire axial length, the maximum radial distance of the pressing ridge, in particular of the pressing surface and/or a pressing spine, in the rear region of a pressing surface of the pressing ridge, as seen in the direction of rotation, from the tool axis is greater, in particular greater by 0.01% to 5%, preferably by 0.1% to 2%, than the radial distance of the associated preceding milling edge from the tool axis. As a result a radial excess length of the pressing ridge in relation to the milling edge is preferably defined, wherein preferably the radial excess length axially with respect to the tool axis is constant at least in sections, preferably over the entire axial length.

In a preferred embodiment, each pressing ridge and the associated milling edge in each case extend twisted by a helix angle, in particular along a helix, wherein the helix angle is constant in the axial direction or else varies at least in sections and/or is selected in particular between 10° and 80°, in particular between 30° and 50°.

The maximum radial distance of the pressing ridge, in particular the pressing surface and/or the pressing spine, from the tool axis, and the radial distance of the associated preceding milling edge from the tool axis are in each case constant preferably over the entire axial length. The milling edge and pressing ridge preferably run parallel to each other, or the pitch angle is preferably constant over the entire axial length.

In a particularly advantageous embodiment, the non-cutting engagement depth is smaller than the chip-removing engagement depth, in particular by at least a factor of 3, preferably by at least a factor of 12, and/or the chip-removing engagement depth (T to Tmax) is selected to be in an interval between the non-cutting engagement depth and the groove depth of the first separating groove, in particular cooling and/or lubricating groove, and/or in an interval of 6% to 30% of the radial distance of the milling edge and/or corresponds at least to the difference of the maximum radial distance of the pressing ridge, in particular the pressing surface thereof, and the radial distance of the milling edge.

In a preferred refinement analogous to an end milling cutter, the rotationally symmetrical circumferential surface is a cylinder surface, and/or the tool is suitable and intended for machining workpiece surfaces which are flat or are curved only in two dimensions in space and are directed parallel to the tool axis.

Figure 2:
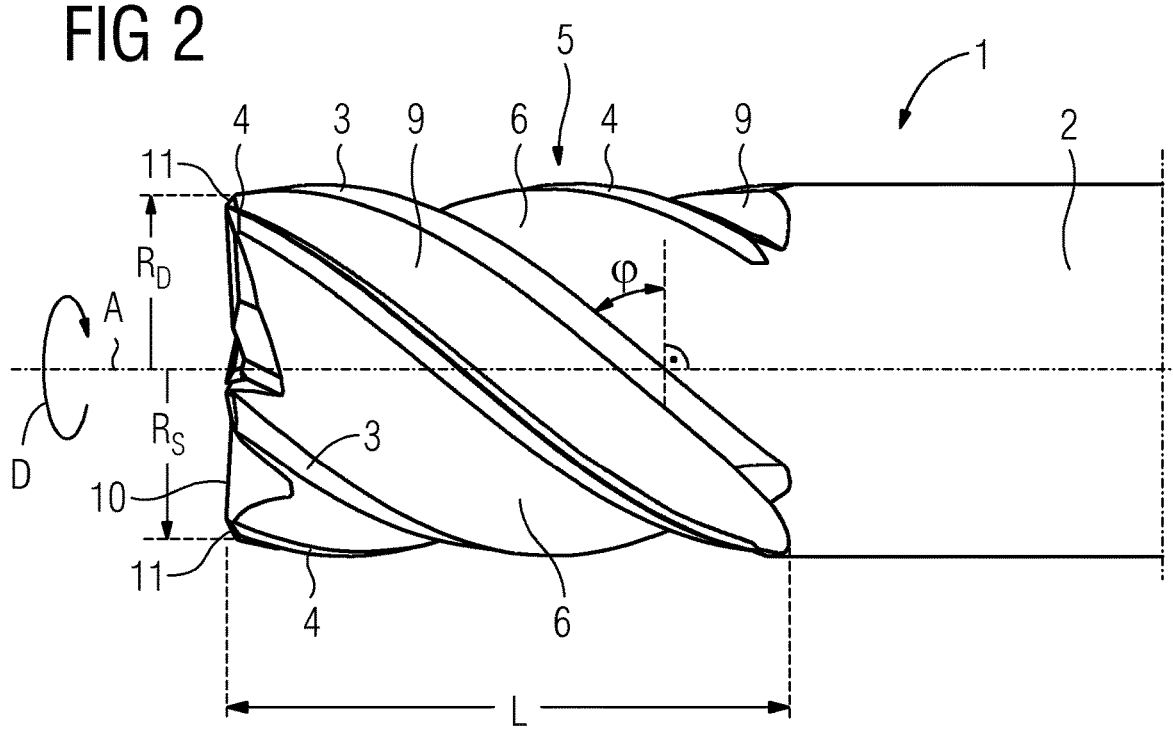
Figure 3:
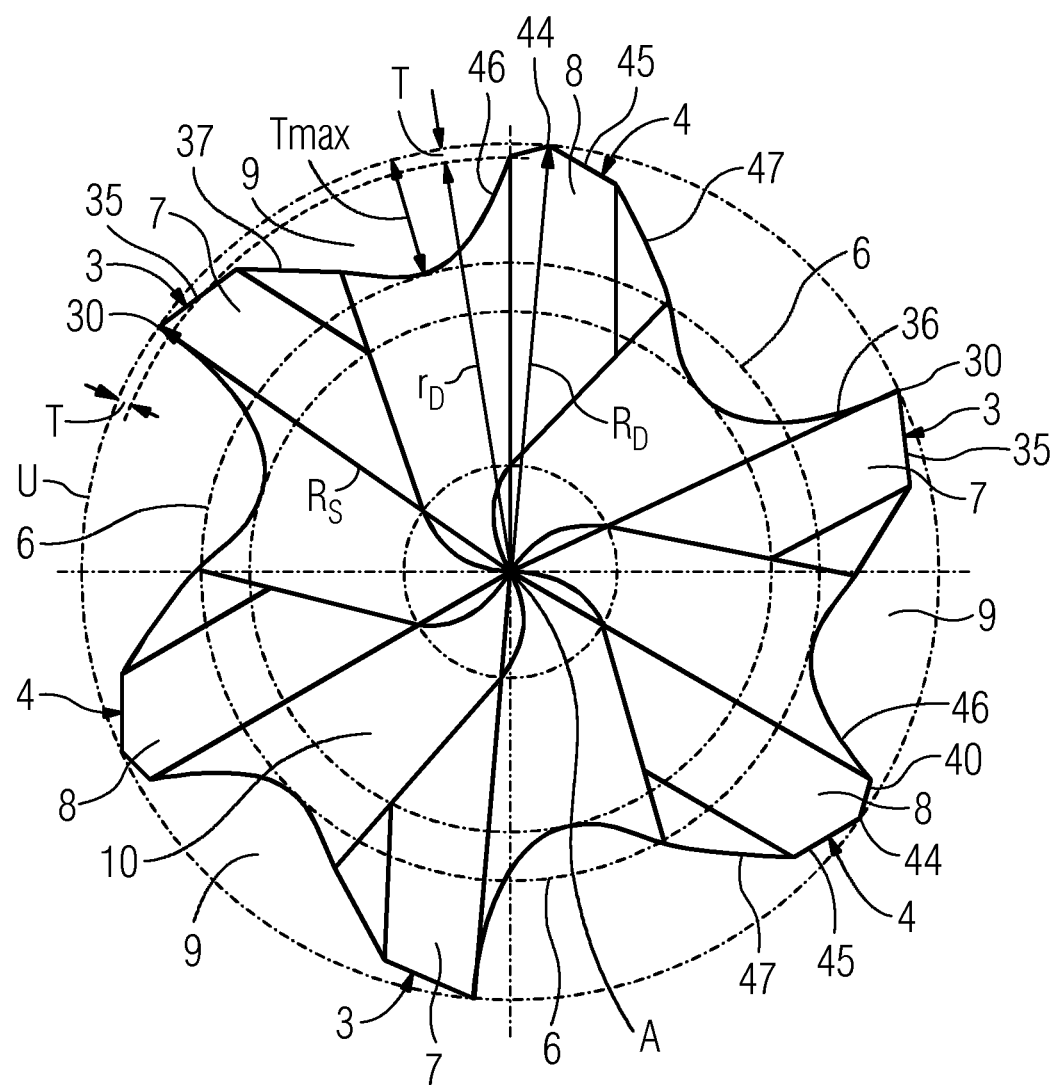
Figure 4:
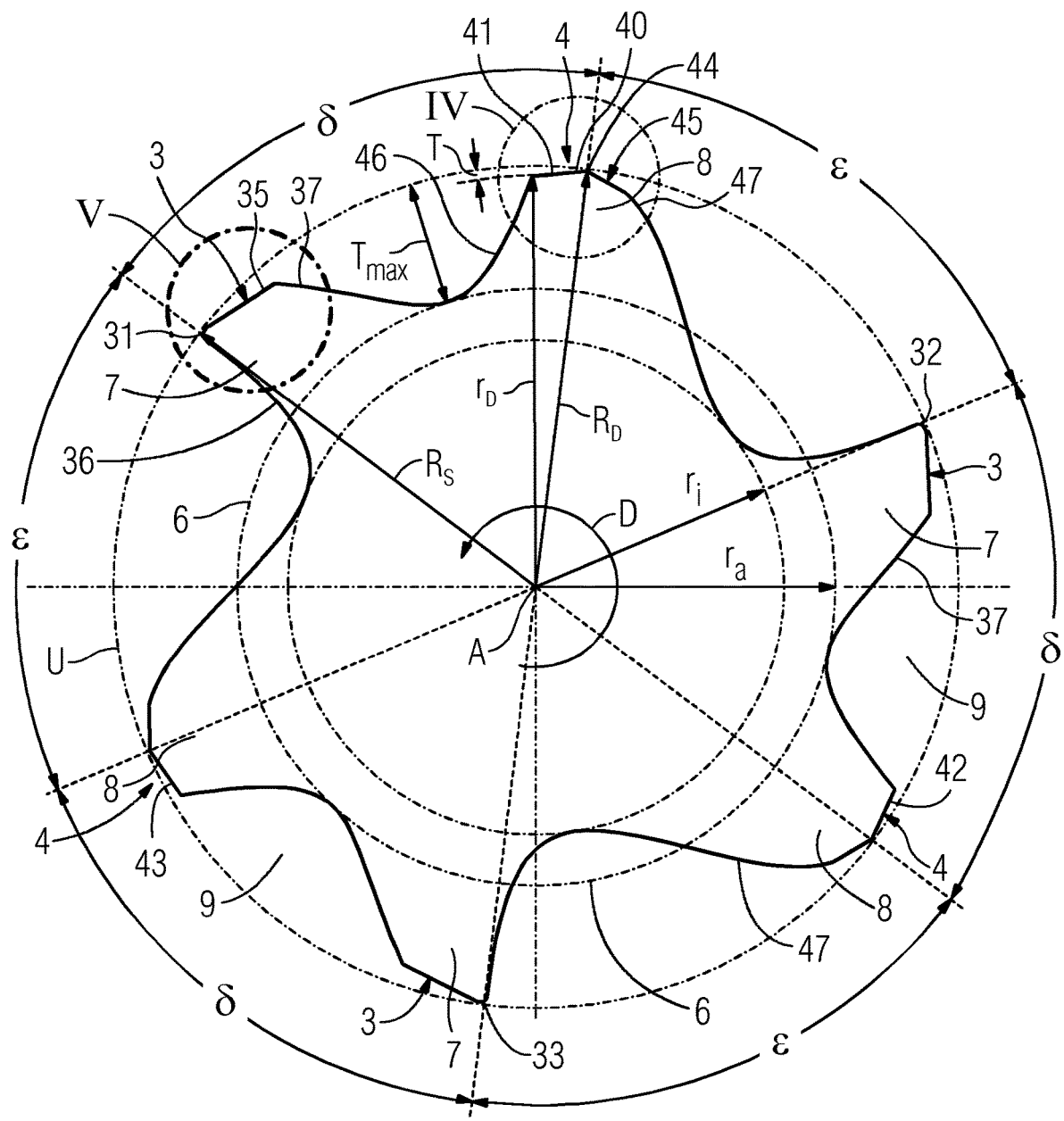
Figure 5:
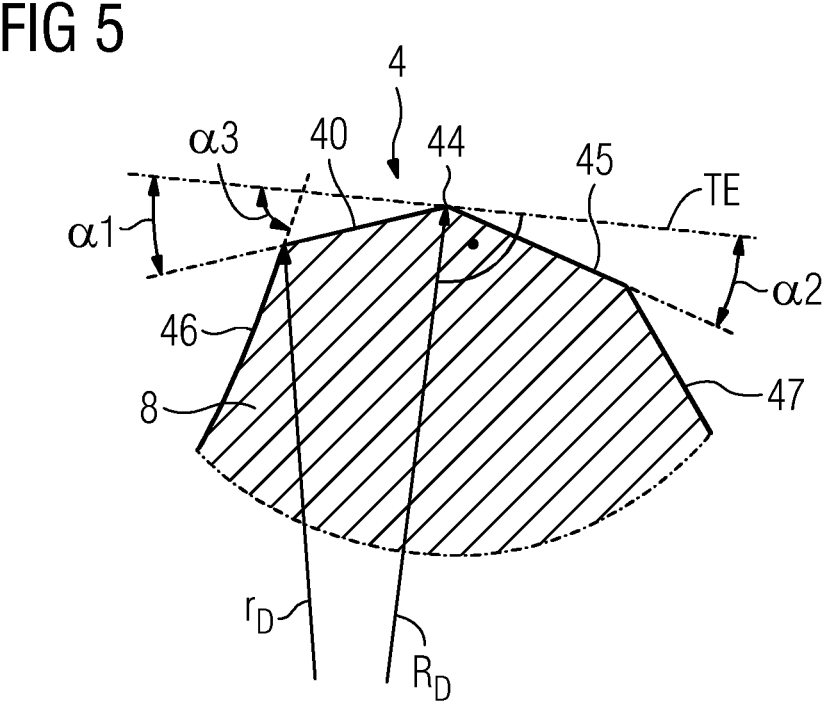
Figure 6:
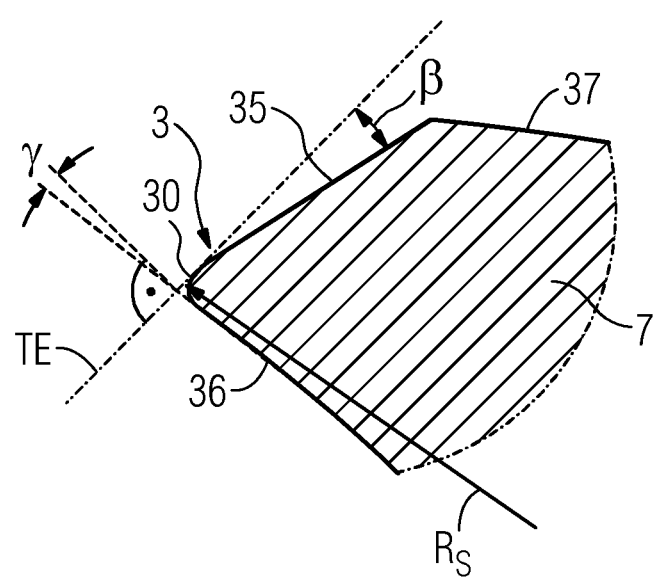

The invention is also illustrated below in respect of further features and advantages with reference to the description of an exemplary embodiment of the invention and in the attached schematic drawings, in which:

FIG. 1 shows a side view of a finishing tool in an embodiment with two milling edges and two pressing ridges, FIG. 2 shows a side view of a finishing tool in an embodiment with three milling edges and three pressing ridges, FIG. 3 shows a front view of the finishing tool according to FIG. 2, FIG. 4 shows the finishing tool according to FIG. 2 or FIG. 3 in a cross section, FIG. 5 shows an enlarged illustration of a pressing ridge of the finishing tool according to FIGS. 2 to 4 in a cross section, and FIG. 6 shows an enlarged illustration of a milling edge of the finishing tool according to FIGS. 2 to 4 in a cross section.

The finishing tool 1 in the embodiments according to FIG. 1 or FIG. 2 has a shaft 2 with a head part 5 at its end. The shaft 2 is rotatable together with the head part 5 about a tool axis A running through the shaft 2 centrally and longitudinally. The shaft 2 is as a rule shaped substantially cylindrically, i.e. substantially in circular form in cross section, but, in addition to the circular form, can also have other, even increasing or decreasing and/or shape-changing cross-sectional forms. During operation, the finishing tool 1 is held or clamped at an end of the shaft 2 remote from the head part 5 in a machine-tool clamping device (not illustrated) or a tool holder or a tool chuck, which is coupled to at least one drive for driving or moving the tool 1 in a rotational movement about the tool axis A in the direction of rotation D and in an advancing movement relative to the workpiece surface, typically parallel to the workpiece surface.

The head part 5 has one or more material milling regions 3 and one or more material shaping regions 4, wherein the number of material shaping regions 4 preferably corresponds to the number of material milling regions 3. In the embodiment according to FIG. 1, this number is in each case 2, and, in the embodiment according to FIGS. 2 to 4, this number is in each case 3. In the circumferential direction or direction of rotation D, each material milling region 3 is followed by an associated material shaping region 4.

Each material milling region 3 has a continuous milling ridge 7 with a milling edge 30 which is continuous in an axial direction with respect to the tool axis A.

Each material shaping region 4 has a pressing ridge 8 which is continuous in the axial direction and has a pressing surface 40, which is continuous in the axial direction, and a pressing spine 44.

A separating groove 9 is formed between each milling ridge 7 and the associated following pressing ridge 8, said separating groove preferably being provided as a cooling and/or lubricating groove for cooling and/or lubricating the working regions, in particular the pressing surface 40, by coolant and/or lubricant, for example an oil, being supplied via the groove 9.

A separating groove 6 is likewise formed between each pressing ridge 8 and the following milling ridge 7, said separating groove also being provided as a chip groove for receiving and removing the milling chips of the associated milling edge 30.

As illustrated, for example, in FIG. 4, each chip groove 9 extends to a depth which lies in an inner radius or core radius $r_i$, while, by contrast, each separating groove, in particular cooling and/or lubricating groove, 6 preferably only extends to a depth which corresponds to an outer radius $r_a$, wherein as a rule $r_a > r_i$.

In the exemplary embodiment illustrated, the material milling regions 3 and their milling ridges 7 and milling edges 30 and also the material shaping regions 4 and their pressing ridges 8 and pressing surfaces 40 encircle the central tool axis A in a helix profile or along a helix, i.e. are inclined or twisted by a helix angle φ with respect to the tool axis A toward a cross-sectional plane (or: normal plane). The helix angle (φ) can be selected, for example, to be between 10° and 80°, in particular between 30° and 50°.

The milling edges 30 of the material milling region 3 in each case as outermost lines or regions of the respective material milling region 3 run at a constant radius (or: radial distance) $R_S$ with respect to the tool axis A, i.e. on a cylindrical circumferential surface U with said radius $R_S$.

The pressing spines 44 as outermost points of the respective material shaping regions 4 likewise run with the constant radius $R_D$ on a cylindrical circumferential surface U having this radius $R_D$. The pressing surfaces 40 of the pressing ridges 8 of the material shaping regions 4 increase from a front innermost point or region with the radius $r_D$, as seen in the direction of rotation D, radially outward as far as the outermost point or region on the pressing spine 44 with the radius $R_D$, for example in a linear or flat profile, which can be simply produced by means of a ground section, in particular at a shaping angle α1 to a tangential plane TE on the pressing spine 44, as shown in FIG. 4, or with a certain, preferably convex, curvature.

The shaping angle α1 can be selected, for example, to be between −5° and −50°. The pressing spine 44 can have a round bevel, typically with a width of 0.01 to 0.50 mm, which prevents the material shaping region 4 from cutting into the material to be machined, and assists the smoothing of the material on the workpiece surface. A front surface 46 is mounted upstream of the pressing surface 40 in the direction of rotation D, said front surface being able to have an angle of inclination α3 with respect to the tangential plane TE (FIG. 4) that can be selected, for example, to be between −15° and −85°.

Behind the pressing spine 44, as seen in the direction of rotation D, as also illustrated in FIG. 4, each material pressing region 4 and its pressing ridge 8 has a free surface 45 with the free angle α2 with respect to the tangential plane TE, which free surface is then adjoined by a back surface 47 which, in turn, is adjacent to a following separating groove 6 which separates the material pressing region 4 from the following material milling region 3 and preferably serves as a chip groove for removing chips. The free angle α2 of the free surface 45 can be selected, for example, to be between 5° and 60°.

Each material milling region 3 has its milling edge 30 on its front region in the direction of rotation D. A rake surface 36, which leads into the milling edge 30, on the front side of the milling ridge 7 is inclined at a rake angle γ to the normal of the tangential plane TE, which rake angle is preferably a positive rake angle of 0° to 20°, for example approx. 5° to 10°.

The milling edge 30 is rearwardly adjoined in the direction of rotation D by a free surface 35 with the free angle of between 4° and 45° with respect to the tangential plane TE (cf. FIG. 6), which free surface merges in turn into a back surface 37 of the milling ridge 7. The back surface 37 is adjacent to a separating groove 9, in particular a lubricating groove 9, when lubricant is supplied, which separating groove separates the material milling region 3 from a material shaping region 4 following in the direction of rotation D.

Each milling edge 30 and 31 to 33 is formed continuously without interruptions and preferably runs as a smooth finishing milling edge without chip dividers along a circumferential surface U which is rotationally symmetrical about the tool axis A and, in the exemplary embodiment illustrated, is a cylinder surface.

According to one embodiment, the volume of the chip groove 6 decreases axially with respect to the tool axis A away from the end side 10, but may also remain constant or increase.

The pitch angle δ between a milling edge 31 or 32 or 33 and a pressing spine 44 of a pressing surface 41 or 42 or 43, which is downstream, as seen in the direction of rotation D, is smaller, preferably smaller by 5% to 30%, than the pitch angle ε between the pressing spine 44 of said pressing surface 41 or 42 or 43 and the milling edge 32 or 33 or 31 following the latter, as seen in the direction of rotation D. It is thereby assisted that the partial surface just milled by one of the milling edges 31 or 32 or 33 is immediately smoothed by the downstream pressing surface 41 or 42 or 43, as seen in the direction of rotation D. In a preferred, but not absolutely required, uniform pitch, δ+ε=360°/n, wherein n is the number of milling edges 31 to 33 and of the pressing surfaces 41 to 43, here, for example, where n=3, i.e. δ+ε=120°. In the exemplary embodiment illustrated, the pitch angle δ is, for example, δ=55° and the pitch angel ε=65°.

In all of the cases mentioned, the arrangement and design of the milling edges and pressing ridges and of the separating grooves located in between permit continuous surface machining of the workpiece, wherein the workpiece 1 is generally moved at a feed rate in which its tool axis A is directed parallel to the workpiece surface, with simultaneous rapid rotation about its tool axis A, i.e. during a typical milling movement, in particular of an end milling cutter.

The milling ridges 7 and pressing ridges 8 and the separating groves 6 and 9 located in between are preferably all formed integrally and/or of one material and/or are produced in a material-removing manner, for example by grinding.

In the exemplary embodiment illustrated, the direction of rotation D of the finishing tool 1 about the tool axis A is in the clockwise direction, i.e. the tool 1 is designed to rotate clockwise, but, of course, may also be designed to rotate counterclockwise.

A protective bevel 11 can be provided on the outer region on the end side 10 of the finishing tool 1 and the head part 5 thereof. Furthermore, various free surfaces and/or spiral face inclinations can be provided for the milling edges 30 and pressing surfaces 40 which peter out on the end side 10.

In a particularly advantageous embodiment, the radius $R_D$ of the material shaping region 4, in particular of the pressing spine 44, is selected to be somewhat larger than the radius $R_S$ of the milling edge 30, typically by 0.01% to 5%, preferably by 0.5% to 1%, i.e. $R_D$ lies within a range of 1.001 $R_S$ to 1.05 $R_S$ and preferably by 1.005 $R_S$ to 1.01 $R_S$. It is therefore ensured that the material shaping region 4 slightly presses, or engages in a slightly shaping or smoothing manner, with its pressing surface 40 as far as the pressing spine 44 into that partial surface of the workpiece which has already been machined by the preceding material milling region 3 with its milling edge 30, and further smooths said partial surface.

A maximum smoothing depth or maximum radial engagement depth T of the material shaping region 4 and of its pressing ridge 8 corresponds to the difference $R_D - r_D$ and therefore to the radial extent of the pressing surface 4. The actual smoothing depth or radial non-cutting engagement depth of the material shaping region 4 and of its pressing ridge 8 customarily corresponds to the difference $R_D - R_S$ from the radii of pressing spine 44 and milling edge 30 and is customarily lower by at least a factor of 3, preferably a factor of 12, than the chip-removing engagement depth.

The milling edge 30 at the front end of the milling ridge 7 therefore removes a chip from the workpiece surface (not illustrated) and, immediately subsequently, the pressing surface 40 of the pressing ridge 8 engages in said region in a smoothing manner in order to achieve an even better surface quality than has already been achieved with the milling edge 30, which is designed as a finishing edge. The chip here is dependent in respect of its length on the number of milling edges 31 to 33 and the pitch angle and in respect of its thickness on the radial chip-removing engagement depth of the milling edge 30 or 31 to 33 which typically lies in an interval of between $T = R_D - r_D$ and the theoretically maximum value $T_{max} = R_S - r_a$ and/or in an interval of 6% to 30% of the radius $R_S$.

The axial length L of the milling edges 30 or 31 to 33 corresponds to the length projected onto the cylinder axis (Z axis) of the cylindrical circumferential surface, on which or along which the milling edges 30 or 31 to 33 run. The arc length or actual length of the milling edges 31 to 33 and of the pressing ridges 40 or 41 to 43 is greater than the axial length L and is dependent on the radius and the revolving angle or polar angle, about which the milling edge winds or revolves from its start to the end about the central axis A.

The arc length or actual length of the milling edges 30 and 31 to 33 is greater than the axial length L projected onto the tool axis A and, in the case of a helical shape, corresponds to $$\sqrt{R_S^2\eta^2+L_2}$$

The arc length or actual length of the pressing ridges 40 or 41 to 43 is greater than the axial length L projected onto the tool axis A and, in the case of a helix, is $$\sqrt{R_D^2\xi^2+L^2}.$$

The milling edges 30 and 31 to 33 and the pressing ridges 40 and 41 to 43 normally have the same axial lengths L and the same helix angles φ and therefore also the same revolving angles or polar angles $\eta=\xi$ and therefore also the same arc lengths.

The finishing tool 1 or the shaft 2 can be formed from different materials, inter alia, in addition to a tool steel, in particular a high speed steel (HSS steel) or a cobalt-alloyed high speed steel (HSS-E steel), and preferably also, at least in the head part 5 or at the pressing ridges 8 and milling ridges 7, from a carbide, in particular solid carbide, or from a carbide alloy, in particular P steel or K steel or Cermet, or from sintered carbide, in particular from tungsten carbide or titanium nitride or titanium carbide or titanium carbon nitride or aluminum oxide, or from cutting ceramics, in particular polycrystalline boron nitride (PKB), or from polycrystalline diamond (PKD). The surface of the finishing tool 1, in particular the head part 5, is preferably provided with a coating in order to further to improve the finishing properties and also to permit adaptation to different work-piece materials.

The previous exemplary embodiments describe the use of the finishing tool 1 in circumferential milling. However, it is also possible to use a finishing tool 1 according to the invention in end milling, i.e. during machining of the workpiece, in which the tool axis A is perpendicular instead of parallel to the workpiece surface and the milling tool is thereby advanced perpendicularly to the workpiece. In such an exemplary embodiment of a finishing tool 1, the pressing ridges 8 or milling edges 7 with the material shaping regions 4 or material cutting regions 3 are arranged on the end side 10 of said finishing tool.

The finishing tool 1 is depicted here with two or three milling ridges 7 and milling edges 31 to 33 and two or three pressing ridges 8 and pressing surfaces 41 to 43, but may also be formed with one, four, five, six or even more milling ridges and pressing ridges.

Instead of a helical profile, as illustrated, in particular also a rectilinear profile in a direction parallel to the tool axis A on a cylinder surface as the circumferential surface U or else in a direction inclined with respect to the tool axis A, for example on a conical surface as circumferential surface U or else on a spherical circumferential surface U or in general a circumferential surface U which is rotationally symmetrical to the tool axis A is also possible.

Even though the invention has been explained in the exemplary embodiments and in the figures primarily with reference to an end milling cutter, it is likewise also applicable to other types of milling cutter, in which a continuous removal of material over an area of the workpiece takes place with continuous milling edges, for example in the case of slitting milling cutters, angle milling cutters, groove milling cutters, roll milling cutters, disk milling cutters, profile milling cutters, ball milling cutters, prism milling cutters, but with the exception of thread milling cutters, in which a removal of material takes place only in a small partial region of the surface in order to produce the thread and an entirely specific helical movement of the milling cutter is required.

In the case of these milling cutters, the milling edges and the pressing ridges likewise lie on rotationally symmetrical circumferential surfaces, but the latter are not, in all of the types of milling cutter mentioned, cylindrical circumferential surfaces with a constant radial distance or radius in the axial direction with respect to the tool axis A, but may also differ therefrom, for example in the case of the angle milling cutter in the form of a cone or in the case of ball milling cutters in the form of a partially spherical surface which lies in a hemisphere, and, in the case of profile milling cutters, for example in the form of concave, curved, rotationally symmetrical surfaces, for example similarly to a quarter circle, or, in the case of a prism milling cutter, in the form of a triangle pointing with the point outward, in longitudinal section. A common feature of all these circumferential surfaces of these types of milling cutters is that they increase monotonously in an axial direction at a radial distance or radius from the tool axis A, generally as seen in the axial direction from the end surface of the milling cutter (or: from the front to the rear). By contrast, in the case of a thread milling cutter, the radial distance or radius of the thread milling tooth cutting edge in the axial direction with respect to the tool axis A initially increases, according to the thread profile (on the first thread flank), and then decreases again after the maximum of the milling tooth (tooth head) is exceeded (on the second thread flank).

LIST OF REFERENCE SIGNS

1 Finishing tool
2 Shaft
3 Material cutting region
4 Material shaping region
5 Head part
6 Chip groove
7 Milling ridge
9 Pressing ridge
9 Lubricating groove
10 End side
11 Protective bevel
30 Milling edge
31, 32, 33 Milling edge
35 Free surface
36 Rake surface
37 Back surface
40 Pressing surface
41, 42, 43 Pressing surface
44 Pressing spine
45 Free surface
46 Front surface
47 Back surface
D Direction of rotation
A Tool axis
U Circumferential surface
$R_D$, $r_D$ Pressing ridge radius
$R_S$ Cutting edge radius $r_i$ Inner radius
$r_a$ Outer radius
TE Tangential plane
α1 Shaping angle
α2 Free angle
α3 Angle of inclination
β Free angle
γ Rake angle
δ, ε Pitch angle
L Axial length
T Engagement depth
Tmax Maximum engagement depth

We claim:

1. A finishing tool, in particular end milling cutter, the tool
a) being suitable and intended for removing material over the area of a workpiece surface and for smoothing and/or compressing the workpiece surface in a milling movement by rotation about a tool axis (A) in a predetermined direction of rotation (D) with simultaneous advancing relative to the workpiece surface, the finishing tool comprising:
   b) at least one chip-removing milling edge, wherein the chip-removing milling edge:
      b1) extends continuously and without interruptions axially with respect to the tool axis (A) over an axial length (L) on a cylindrical, circumferential surface (U) which is rotationally symmetrical about the tool axis, and at a constant radial distance ($R_S$) from the tool axis (A); and
      b2) is designed in such a manner that, over its entire axial length (L), during the milling movement, it removes workpiece chips from the workpiece surface at a radial chip-removing engagement depth (T to Tmax) with respect to the tool axis; and
      b3) wherein the chip-removing engagement depth (T to Tmax) of the milling edge (30) lies in an interval of 6% to 30% of its radial distance ($R_S$) from the tool axis (A); and
   c) at least one non-cutting pressing ridge, wherein the non-cutting pressing ridge:
      c1) extends continuously and without interruptions axially with respect to the tool axis (A) over an axial length (L) on an, in particular cylindrical, circumferential surface which is rotationally symmetrical about the tool axis,
      c2) is arranged following an associated milling edge by a pitch angle (δ), as seen in the direction of rotation (D), and
      c3) is designed in such a manner that it presses over its entire axial length (L), during the milling movement, at a radial non-cutting engagement depth (T or $R_S$–$R_D$) with respect to the tool axis into the workpiece surface machined by the associated milling edge, and smooths and/or compresses said workpiece surface; and
      c4) the pressing ridge has a pressing surface which increases in its radial distance ($r_D$, $R_D$) from the tool axis (A) in the opposite direction to the direction of rotation (D) up to a maximum radial distance ($R_D$);
   d) wherein the chip-removing engagement depth (T to Tmax) is smaller by at least a factor of 5 than the axial length, and wherein the non-cutting engagement depth (T or $R_S$–$R_D$) is smaller by at least a factor of 10 than the axial length (L).

2. The finishing tool as claimed in claim 1, wherein:
each pressing ridge is separated from a milling ridge with the associated milling edge leading in the direction of rotation by a first separating groove which is provided in particular as a cooling and/or lubricating groove for supplying coolant and/or lubricant to the pressing ridge and/or to the pressing surface;
each milling ridge is separated from a pressing ridge following in the direction of rotation by a second separating groove which is provided in particular as a chip groove for removing chips from the milling edge; and
the first separating groove, in particular cooling and/or lubricating groove, preferably has a radial groove depth ($R_D$–$r_a$) which is smaller by 10% to 35%, than the radial groove depth ($R_S$–$r_i$) of the second separating groove, in particular chip groove.

3. The finishing tool as claimed in claim 1, wherein:
the pressing surface increases in its radial distance ($r_D$, $R_D$) from the tool axis (A) in the opposite direction to the direction of rotation (D) as far as a pressing spine (44) in a rear region of the pressing surface, as seen in the direction of rotation (D), and increases substantially linearly, wherein the difference of maximum radial distance ($R_D$) and minimum radial distance ($r_D$) defines a maximum non-cutting engagement depth;
as seen in the opposite direction to the direction of rotation (D), the pressing surface or the pressing spine is adjoined by a free surface and/or by a back surface of the pressing ridge, which back surface is adjacent to a separating groove, in particular chip groove;
a radially inwardly running front surface of the pressing ridge is arranged upstream of the pressing surface, as seen in the direction of rotation (D), said front surface being adjacent to a cooling and/or lubricating groove; and/or
the pressing spine has a round bevel, typically with a width of 0.01 to 0.50 mm.

4. The finishing tool as claimed in claim 1, wherein:
a shaping angle (α1) of the pressing surface of between −5° and −50° is selected;
a free angle (α2) of the free surface of the pressing ridge of between 5° and 60° is selected; and/or
an angle of inclination (α3) of the front surface of the pressing ridge of between −15° and −85° is selected.

5. The finishing tool as claimed in claim 1, wherein:
each milling edge is formed on a milling ridge, or as seen in the opposite direction to the direction of rotation (D), the milling edge is adjoined by a free surface and/or by a back surface, in particular of the milling ridge, which back surface is adjacent to a separating groove, in particular cooling and/or lubricating groove, and/or wherein a rake surface which is adjacent to a chip groove is arranged upstream of the milling edge, as seen in the direction of rotation (D); and
wherein preferably a rake angle (γ) of the rake surface is selected from a range of 0° to 20°, for example 5° to 10°, and/or wherein preferably a free angle (γ) of the free surface of the milling ridge of between 4° and 45° is selected.

6. The finishing tool as claimed in claim 1, wherein the pitch angle (δ) between a milling edge and directly following the pressing surface, as seen in the direction of rotation (D), is smaller by 5% to 30%, than the pitch angle (ε) between the pressing surface, and the milling edge directly following the latter, as seen in the direction of rotation (D).

7. The finishing tool as claimed in claim 1, wherein:
in each case the same axial position along the tool axis (A), over the entire axial length (L), the maximum radial distance ($R_D$) of the pressing ridge, of the pressing surface or a pressing spine, in the rear region of a pressing surface of the pressing ridge, as seen in the direction of rotation (D), from the tool axis (A) is greater by 0.01% to 5%, preferably by 0.1% to 2%, than the radial distance ($R_S$) of the associated preceding milling edge from the tool axis (A), such that a radial excess length of the pressing ridge in relation to the milling edge is preferably defined; and the radial excess length axially with respect to the tool axis A is constant at least in sections, preferably over the entire axial length (L).

8. The finishing tool as claimed in claim 1, wherein:

each pressing ridge and the associated milling edge in each case extends twisted by a helix angle ($\varphi$), in particular along a helix, wherein the helix angle ($\varphi$) is constant in the axial direction or else varies at least in sections and/or is selected in particular between 10° and 80°, in particular between 30° and 50°, the maximum radial distance ($R_D$) of the pressing ridge, in particular the pressing surface (40) and/or the pressing spine, in the rear region of the pressing surface of the pressing ridge, as seen in the direction of rotation (D), from the tool axis (A), and the radial distance ($R_S$) of the associated preceding milling edge from the tool axis (A) is in each case constant preferably over the entire axial length (L), and/or the milling edge and pressing ridge run parallel to each other, or the pitch angle is constant over the entire axial length (L).

9. The finishing tool as claimed in claim 1, wherein:

the non-cutting engagement depth ($R_D$-$r_D$) is smaller than the chip-removing engagement depth (T to Tmax) by at least a factor of 3 to 12;

the chip-removing engagement depth (T to Tmax) lies in an interval between the non-cutting engagement depth ($R_D$-$r_D$) and the groove depth ($R_D$-$r_a$) of the first separating groove, in particular cooling and/or lubricating groove;

and/or in an interval of 6% to 30% of the radial distance ($R_S$) of the milling edge and/or corresponds at least to the difference of the maximum radial distance ($R_D$) of the pressing ridge, in particular the pressing surface thereof, and the radial distance ($R_S$) of the milling edge.

* * * * *